United States Patent [19]

Greeley

[11] Patent Number: 5,022,982
[45] Date of Patent: Jun. 11, 1991

[54] ROTARY DRUM SOLID WASTE AIR CLASSIFIER

[75] Inventor: Robert H. Greeley, Kennett Sq., Pa.

[73] Assignee: CPM Energy Systems Corporation, Greenville, Del.

[21] Appl. No.: 296,604

[22] Filed: Jan. 13, 1989

[51] Int. Cl.⁵ .................... B07B 9/02; B07B 11/06
[52] U.S. Cl. ..................... 209/12; 209/147; 209/152; 241/DIG. 38
[58] Field of Search ..... 209/152, 146, 147, 134–139.1, 209/3, 12; 241/DIG. 38

[56] References Cited

U.S. PATENT DOCUMENTS

| | | | |
|---|---|---|---|
| 1,402,783 | 1/1922 | Meyer | 209/152 |
| 2,960,222 | 11/1960 | Benson | 209/152 |
| 3,970,547 | 7/1976 | Theodore et al. | 209/152 X |
| 4,002,559 | 1/1977 | Paterson et al. | 209/152 X |
| 4,016,071 | 4/1977 | Paterson | 209/152 |
| 4,052,797 | 10/1977 | Christensen | 34/342 |
| 4,070,202 | 1/1978 | Nollet | 209/11 X |
| 4,178,232 | 12/1979 | Nollet | 209/152 X |

OTHER PUBLICATIONS

Model 8020 RDC Iowa Manufacturing Co. Sales Brochure.

Primary Examiner—Donald T. Hajec
Attorney, Agent, or Firm—Connolly & Hutz

[57] ABSTRACT

A rotary drum solid waste air classifier includes an inclined drum in which is mounted a non-rotatable separation enhancing tube which extends longitudinally completely through the drum. A waste conveyor is longitudinally mounted within the tube. The feed end of the waste conveyor is located outwardly of the lower end of the tube for receiving solid waste and conveying it through the rotating drum. The tube has a delivery cut-out at and below the discharge end of the waste conveyor so that the waste may fall from the discharge end of the waste conveyor and the discharge from the lower end of the drum while the light fraction flows up the drum and into a plenum downstream from the drum.

16 Claims, 5 Drawing Sheets

ROTARY DRUM SOLID WASTE AIR CLASSIFIER

BACKGROUND OF INVENTION

Various types of rotary drum air classifiers exist which are used in the solid waste separation system. In such arrangements the solid waste is fed onto a conveyor which is located outwardly of an inclined rotating drum and the conveyor extends into the drum. Loose lightweight particles are entrained in the controlled low velocity air stream within the drum which is induced by ar exhaust fan. These systems are arranged to cause the waste particles to separate from each other into heavy and light fractions. Heavy particles are discharged from the conveyor and progress down the inclined drum where they are discharged into a chute at the lower end of the drum. The light fraction is drawn into a plenum. Such a system is available from Iowa Manufacturing Company such as model 8020. In that system the conveyor extends only a short distance into the drum. A disadvantage is that it is necessary to mount the conveyor in a cantilevered fashion. Additionally, the separation technique is not as efficient because of the short distance that the conveyor extends into the drum causing a change in air velocity. This results in some mid-weight particles, rather than a complete division into light and heavy fractions.

Other typical rotary drum classifiers are disclosed in U.S. Pat. Nos. 3,970,547; 4,052,797; 4,070,202; and 4,178,232.

SUMMARY OF INVENTION

An object of this invention is to provide a solid waste separation system which effectively separates the heavy and light fractions of the waste material to permit an efficient recycling.

A further object of this invention is to provide such a system which includes a rotary drum air classifier which is reliable both in operation and stability.

In accordance with this invention, a rotary drum solid waste air classifier includes a rotating classification drum mounted at an angle and which communicates with a plenum downstream from the drum. A non-rotatable separation enhancing tube is mounted longitudinally in the drum and extends completely through the drum. A waste conveyor is longitudinally mounted within the tube. The feed end of the waste conveyor is located outwardly of the lower end of the drum for receiving the waste material. The discharge end of the waste conveyor is located within the drum. The tube includes a delivery cut-out located at and below the discharge end of the waste conveyor so that the solid waste may fall from the discharge end of the waste conveyor through the delivery tube cut-out and then down the inclined drum. The airflow in the drum cause the light fraction to flow up the drum while the heavy fraction is discharged from the lower end of the drum. The light fraction continues to flow up the drum and is drawn into the plenum.

The separation process is enhanced by the lifting and dropping action caused by the rotating drum. The separation process is further enhanced by the falling material striking the center tube which aids in shaking light material from heavy objects.

In a preferred embodiment of this invention, the tube is supported at its feed end externally beyond the lower end of the drum and at its discharge end externally beyond the upper end of the drum and within the plenum. The conveyor is mounted directly to the tube thereby avoiding a cantilever type mounting. In the preferred embodiment of this invention the discharge end of the conveyor is located a substantial distance such as about one-half of the length of the drum.

THE DRAWINGS

FIG. 1 is a schematic perspective view illustrating a total recycling system in accordance with this invention;

FIG. 2 is a side view in elevation of the drum solid waste air classifier used in the system of FIG. 1; and FIGS. 3, 4 and 5 are cross-sectional views taken through FIG. 2 along the lines 3—3, 4—4 and 5—5.

DETAILED DESCRIPTION

Figure 1:
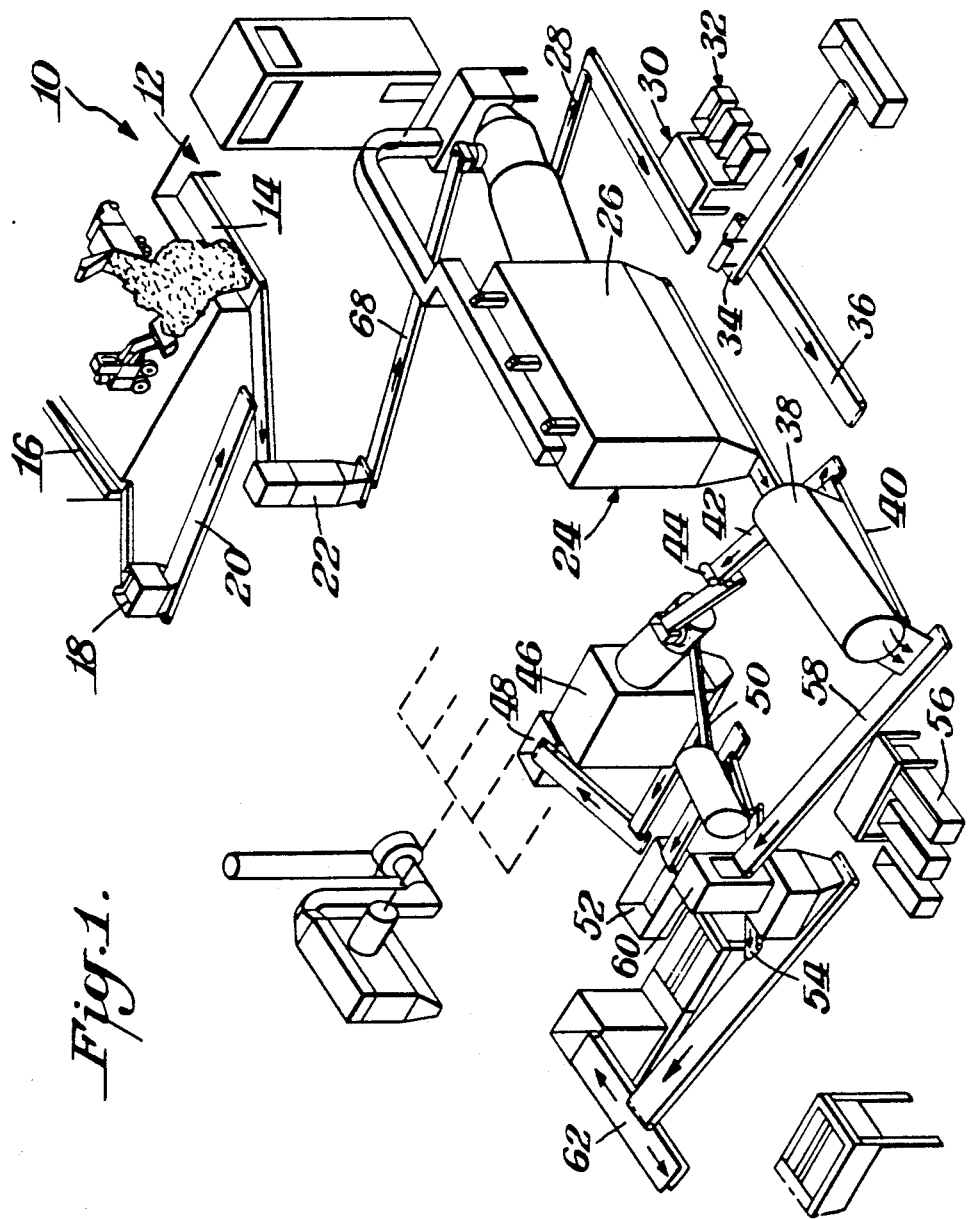

FIG. 1 illustrates a total recycling system 10 in accordance with this invention. As illustrated therein solid waste material such as municipal solid waste is initially received at receiving station 12. At station 12 the oversized bulky waste material is separated from the remainder of the waste. The solid waste is then fed onto feed conveyor 14 while the oversized bulky waste is fed onto its feed conveyor 16. The oversized bulky waste passes through a shear shredder 18 which cuts the oversized bulky waste to, for example, four inch particle size. The shredded waste is then fed onto feed conveyor 20 where it is discharged to mix with the remainder of the solid waste from conveyor 14. The mixed solid waste then passes through BAG opener 22. Loose materials are fed into rotary drum air classifier 24 where the air flow conveys the light fraction of the solid waste into settling or plenum chamber 26 and the heavy fraction tumbles in the drum until it spills out of the bottom end onto conveyor 28.

The heavy fraction of the solid waste then passes to a picking station 30 where the large pieces of metal (ferrous, non-ferrous and non-magnetic ferrous) are removed as indicated by the appropriate bins 32. The remaining heavy fraction passes to a magnet system 34 where light gauge ferrous (e.g. tin cans) and other ferrous items are removed and where the remaining material goes to composting or directly to a landfill as indicated by the discharge end of conveyor 36.

The light fraction of the solid waste is conveyed for example to a six inch Trommel (rotating screen) 38. The fraction passing through the six inch holes, such as material containing aluminum cans is conveyed by conveyors 40,42 to callander rolls 44 where the material is flattened. The material is then conveyed to a small rotary drum air classifier 46. Flattened cans are separated from other light fractions and in this sense are the heavy fraction of the material being classified. The cans are conveyed to a storage container 48. The light fraction is conveyed to a ¾ inch Trommel screen 50 where the fines or grit are removed and conveyed to box 52 for transfer to a landfill. The grit free light fraction is conveyed to shredder discharge conveyor 54.

Oversized material in trommal 40 is conveyed past the picking station and material such as corrugated board, newsprint and box board which are the best materials are sorted out at sorting station 56. The oversized material remaining on conveyor 58 is shredded to, for example, nominal four inch particles which is used as refuse derived fuel at station 60. The refuse derived fuel is then conveyed to pack-out system 62 and packed into transfer trailers.

Figure 2:
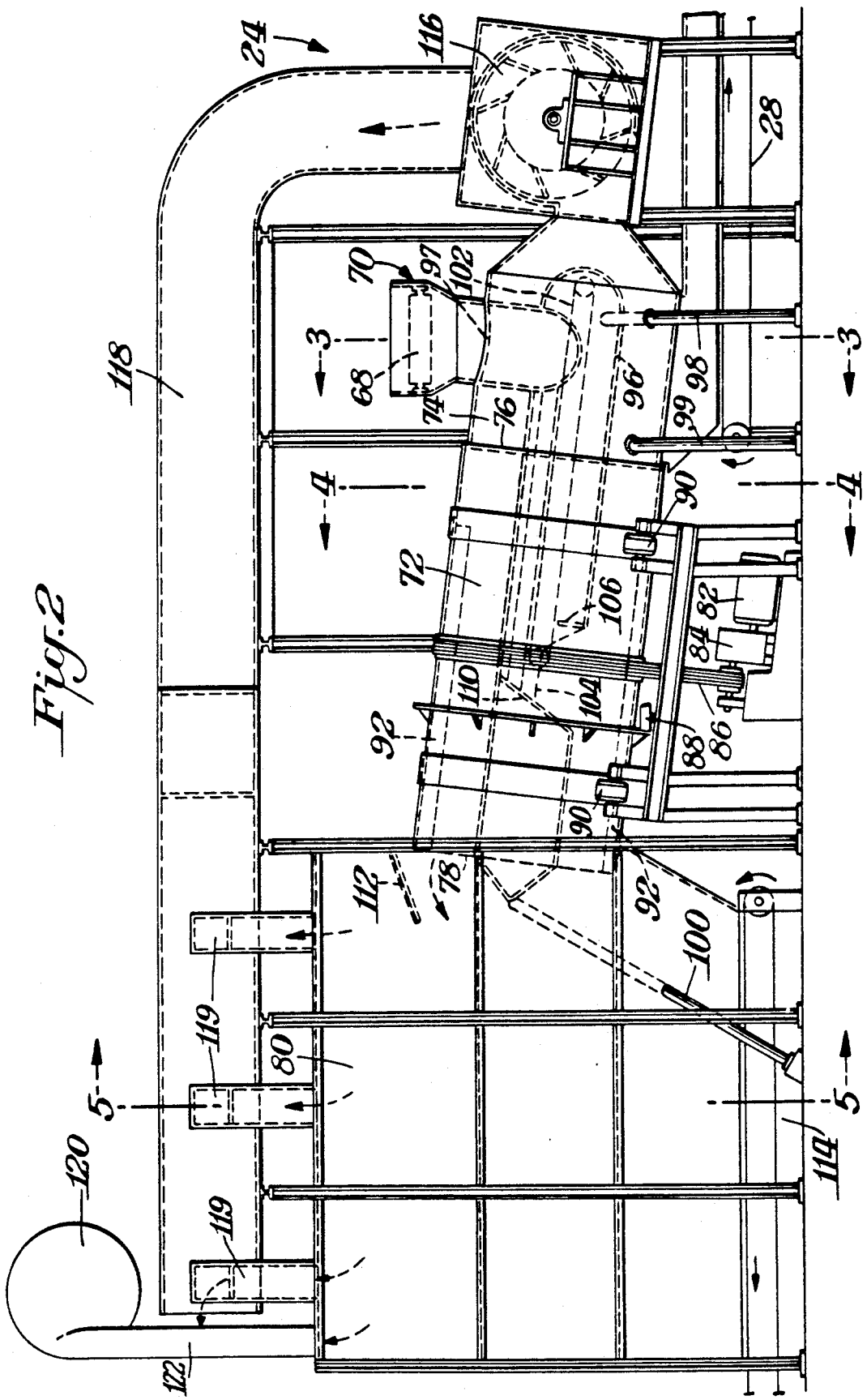
Figure 3:
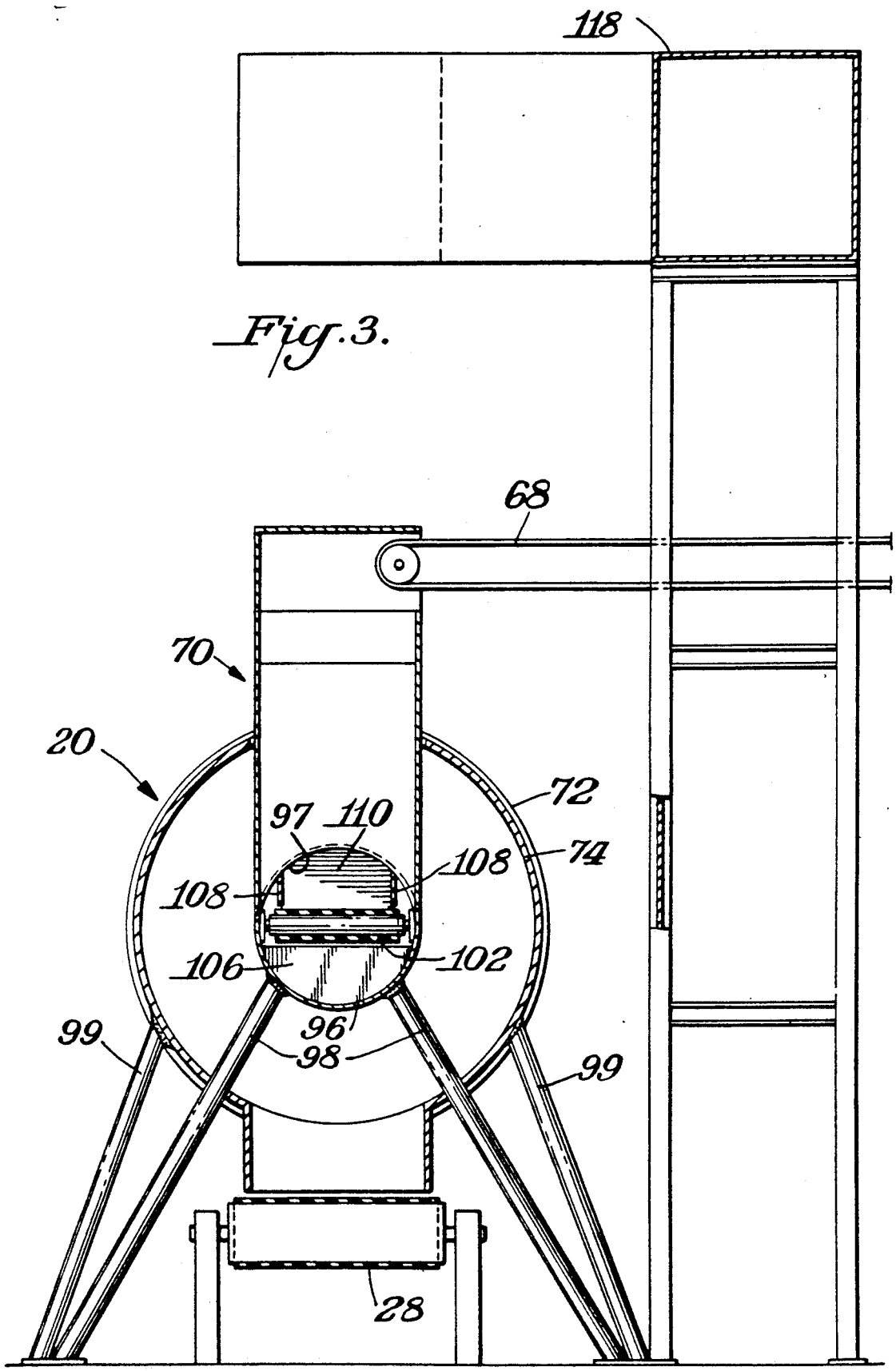
Figure 4:
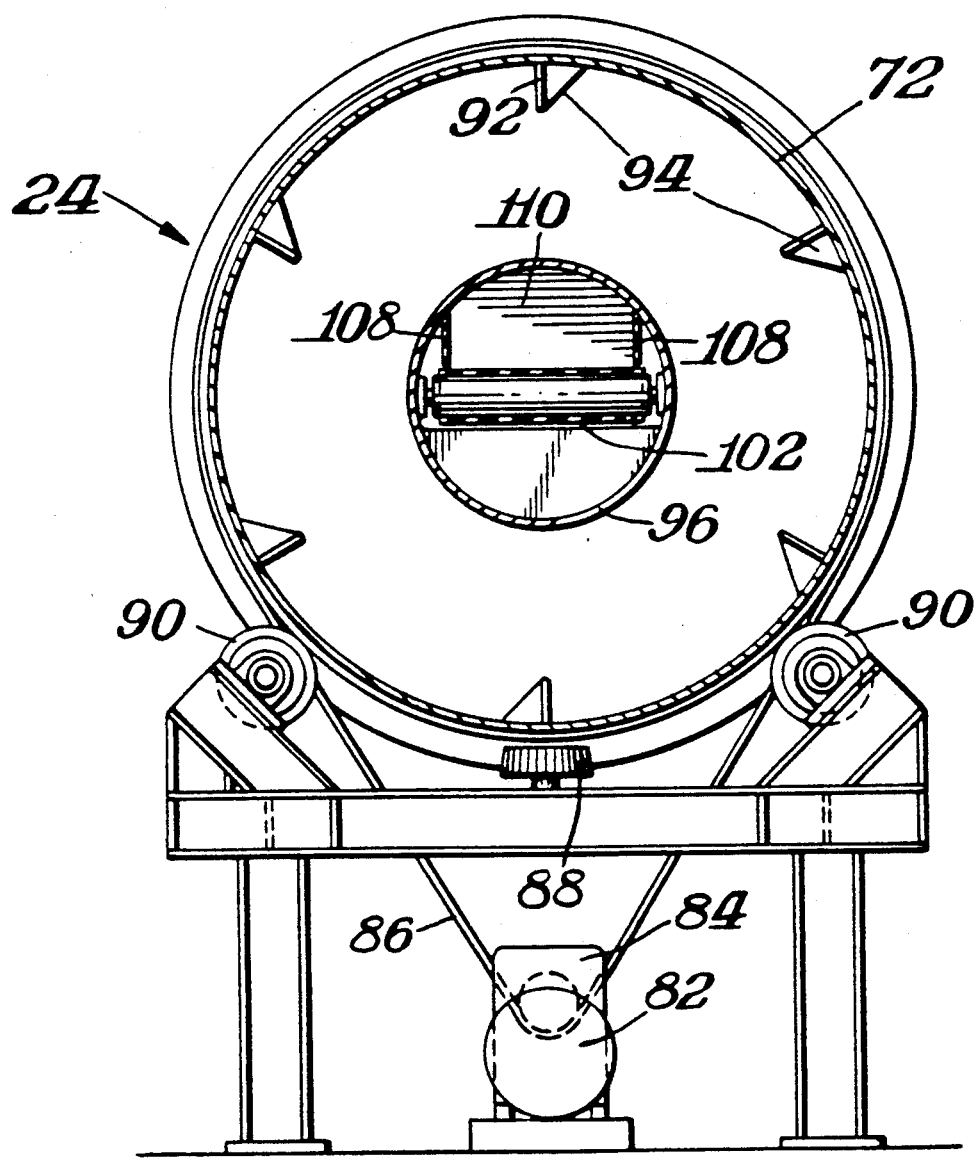
Figure 5:
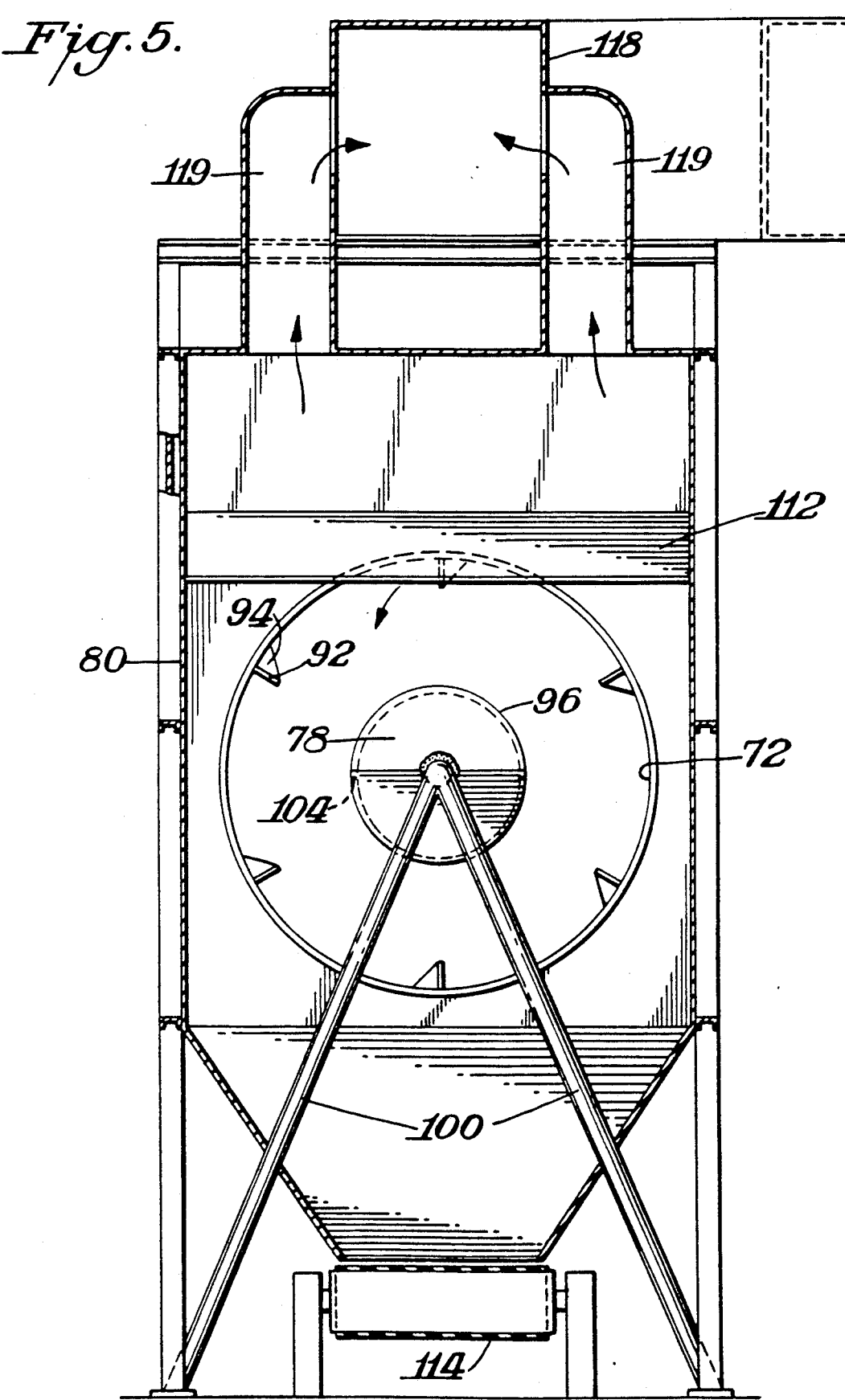

FIGS. 2-5 illustrate the details of rotary drum solid waste air classifier 24. As shown therein, solid waste is fed by conveyor 68 into hopper and feed tube 70, downstream from inclined rotating classification drum 72 through an opening in shroud 74 which is mounted concentrically with drum 72. FIG. 2 illustrates drum 72 to have a lower feed end 76 and upper discharge end 78 which extends into plenum chamber 80. (Plenum chamber 80 is the same as plenum 26 of FIG. 1.) Drum 72 may be driven in any conventional manner, such as by motor 82 connected with gear reducer 84 which drives drive band 86. Drive band 86 extends around drum 72 to rotate the drum with the aid of thrust roller 88 and idlers 90 in the known manner. Similarly, as with prior drums, drum 72 would include peripherally located flights 92 mounted to the drum by the aid of triangular brackets 94.

In accordance with this invention a non-rotatable separation tube 96 is mounted co-axially within drum 72 and extends completely through drum 72. Tube 96 is mounted externally of drum 72 by means of sets of braces. For example, as illustrated, braces 98, extend through appropriate openings in shroud 74 upstream from drum 72. Shroud 74 in turn is supported by braces 99. Another set of braces 100 extends through suitable openings in plenum chamber 80 downstream from drum 72. Thus, tube 96 is directly mounted at both ends rather than by any cantilever type mounting. Tube 96 contains a cut-out 97 for receiving feed tube 70.

As also illustrated waste conveyor 102 is mounted within tube 96 generally along the axis of tube 96. Conveyor 102 is mounted at spaced locations, in any suitable manner, directly to tube 96 so as to avoid the necessity of any cantilever type mounting. As illustrated in FIG. 2 the feed end of conveyor 102 is generally located below hopper and feed tube 70 downstream and externally of drum 72. As also illustrated in FIG. 2 conveyor 102 extends a substantial distance into drum 72, such as at least one-half the length of drum 72. The further distance conveyer 102 extends into drum 72, the greater the efficiency in drawing the light fraction into plenum 80.

Tube 96 includes a delivery cut-out 104 located below the discharge end of waste conveyor 102. In this manner, the solid waste may fall from the discharge end of waste conveyor 102 and through delivery cut-out 104 and then onto the rotating drum 72 where it is separated in the air stream and the heavy fraction is discharged from the lower end 76 onto heavy fraction conveyor 28. The light fraction flows up the drum 72 where it is drawn into plenum 80.

As illustrated, tube 96 includes a dam 106 extending vertically upwardly at the upstream end of delivery cut-out 104. Dam 106 prevents any waste from falling into the lower portion of tube 96. Additionally, tube 96 includes diverter plates 108 which helps confine the waste at the discharge end of waste conveyor 102. Diverter or guide plates 108 are mounted by welding or any other suitable fashion directly to tube 106 and extend downwardly juxtaposed conveyor 102. The delivery cut-out 104 also includes a diverter 110 in the form of a plate at the downstream end of cut-out 104 to direct the waste into the drum 72. Within plenum 80 immediately downstream from drum 72 is a baffle 112 to assure flow of the light fraction into the interior of plenum 80. The light fraction then falls to conveyor 114 where it would be conveyed to trommel 38.

As illustrated in FIG. 2 the air flow for plenum 80 is created by fan 116 which communicates with plenum 80 by duct 118 through side ducts 119. Dust in plenum 80 is collected by cyclone or dust collector 120 through duct 122 in a known manner. FIG. 2 illustrates by arrows the direction of flow.

The present invention has a number of advantages over the prior art. For example, utilization of the tube 96 permits the conveyor 102 to be directly supported throughout its length rather than relying upon a cantilever support. Moreover, by extending tube 96 completely through drum 72 tube 96 may be supported at both ends.

A further advantage of the invention is that it creates uniform air velocity. In this respect, because of the uniform air velocity all of the solid waste material is separated into either a heavy or a light fraction.

The cut-out 104 at the discharge end of conveyor 102 permits all of the waste to exit into the rotating drum 72 where the heavy fraction exits the lower end 76 of drum 72 where it can be conveyed for later processing.

The inventive arrangement which utilizes tube 96 also permits conveyor 102 to be located at its discharge end near the mid-point of drum 72. Since the majority of the solid waste is the light fraction, by locating the discharge end of conveyor 102 near the plenum 80 the light fraction is removed more quickly while the heavy fraction is lifted and dropped striking the center tube and then falling to the lower side of the drum, where it is once again lifted and dropped and effectively works is way down drum 72 dislodging other light material and is ultimately discharged.

What is claimed is:

1. In a rotary drum solid waste air classifier in which lightweight waste material is separated as a light fraction from the remaining heavy fraction in a solid waste treatment system wherein the waste material is fed to the lower feed end of an inclined rotating classification drum with the waste material being conveyed by a conveyor into the drum and the heavy fraction is discharged by gravity from the lower end of the drum and the light fraction is entrained by air and discharged from the upper end of the drum into a plenum, the improvement being in that a non-rotatable separation enhacing tube is mounted longitudinally in said drum and extends completely through said drum, said waste conveyor being longitudinally mounted within said tube, the feed end of said waste conveyor being located outwardly of said lower end of said drum, the discharge end of said waste conveyor being located within said drum, and said tube having a delivery cut-out at and below said discharge end of said waste conveyor whereby the waste material falls from said discharge end of said waste conveyor and through said delivery cut-out and onto said drum for being discharged from said lower end of said drum and whereby the light fraction is conveyed by the air flow into said plenum.

2. The classifier of claim 1 wherein said tube includes a feed end and a discharge end, said tube being supported at said feed and of said tube externally beyond said lower end of said drum, and said tube being supported at said discharge end of said tube externally beyond said upper end of said drum within said plenum.

3. The classifier of claim 2 wherein said tube is supported by sets of braces, and said braces for said discharge end of said tube being mounted to said tube and extending through openings in the external wall of said plenum.

4. The classifier of claim 2 wherein said waste conveyor is mounted to and supported by said tube.

5. The classifier of claim 4 wherein said discharge end of said waste conveyor is located a substantial distance into said drum.

6. The classifier of claim 5 wherein said substantial distance is at least about one-half of length of said drum.

7. The classifier of claim 5 wherein said substantial distance is about one-half the length of said drum.

8. The classifier of claim 5 wherein said tube is coaxial with said drum.

9. The classifier of claim 8 wherein said waste conveyor is mounted along the longitudinal axis of said tube.

10. The classifier of claim 9 wherein said tube contains a feed cut-out in its upper surface at said feed end of said tube for receiving waste material therein, and said feed end of said waste conveyor being located under said feed cut-out.

11. The classifier of claim 10 including a dam mounted at the downstream end of said delivery cut-out, and vertical guides extending downwardly from said tube to said waste conveyor discharge end.

12. The classifier of claim 11 including a diverter mounted said delivery cut-out.

13. The classifier of claim 12 including an inclined baffle mounted in said plenum above and downstream from said tube.

14. The classifier of claim 13 including dust collecting means communicating with said plenum.

15. The classifier of claim 1 in combination with a solid waste recycling system comprising a solid waste receiving station, a separating station for separating oversize bulky waste from the solid waste, means for shredding the oversize bulky waste and feeding the shredded waste to the solid waste, means for feeding the solid waste to said classifier, means for conveying the heavy fraction from said classifier to a heavy fraction receiving station, and means for conveying the light fraction from said classifier to a light fraction receiving station.

16. The classifier of claim 1 wherein said tube increases the separation action by the heavy fraction striking said tube while being dropped during tumbling as a result of said drum rotating whereby the light fraction is loosened from the heavy fraction and the air flow through said drum carries the light fraction up said drum and into said plenum.

* * * * *